H. G. MACKINNEY.
Handkerchief-Holder.

No. 165,940. Patented July 27, 1875.

Witnesses.

Herbert G. Mackinney.
by his attorney.

UNITED STATES PATENT OFFICE.

HERBERT G. MACKINNEY, OF NORTH ATTLEBOROUGH, MASSACHUSETTS.

IMPROVEMENT IN HANDKERCHIEF-HOLDERS.

Specification forming part of Letters Patent No. 165,940, dated July 27, 1875; application filed June 15, 1875.

*To all whom it may concern:*

Be it known that I, HERBERT G. MACKINNEY, of North Attleborough, of the county of Bristol and State of Massachusetts, have invented a new and useful Improvement in Handkerchief-Holders; and do hereby declare the same to be fully described in the following specification, and represented in the accompanying drawings, of which—

Figure 1:
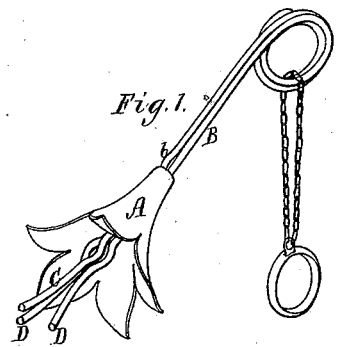
Figure 2:
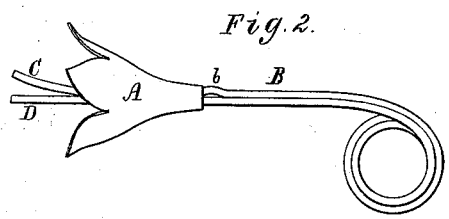
Figure 4:
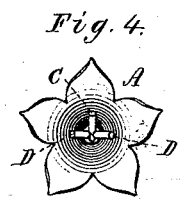
Figure 3:
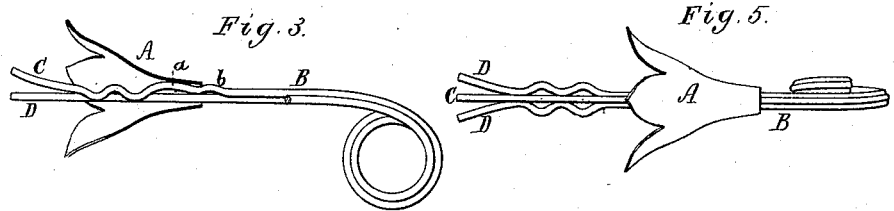
Figure 5:
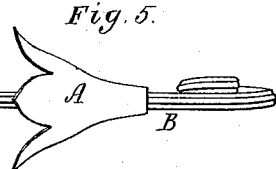

Figure 1 is a perspective view, Fig. 2 a side view, Fig. 3 a longitudinal section, and Fig. 4 a front end view, of a holder containing my invention. Fig. 5 is a top view of it.

It is composed of a trumpet-slide and a stem, provided with three corrugated wires or jaws. The trumpet-slide A I usually make stellated at its larger base or end, as shown in the drawings, in which such slide is represented at A as arranged to slide upon a stem, B, which terminates in three corrugated branches or wires, C D D, they being shown in top view in Fig. 5. The corrugations of the two wires marked D D are in one plane, while those of the wire marked C are in a plane at right angles with that of the corrugations of the wires D D, all being in other respects as shown.

On inserting a portion of a handkerchief between the corrugated wires, and sliding forward upon them the trumpet-slide, they will by it be closed together upon the handkerchief and hold it firmly. The trumpet-slide, in order to hold the jaws compressed upon the handkerchief, is caused to retain its place by the first and second corrugations $a$ $b$ of the wire C, the smaller end of the slide being brought between them when the slide is fully drawn forward.

The stem may be curved, as shown in the drawings; or it may terminate in a ring, and it may be composed of a single rod or of the three wires arranged and soldered or fastened together in a fascis or handle.

The three wires or branches corrugated as shown operate to hold the handkerchief very much firmer than two jaws or rods only would.

I am aware that a dish-cloth holder, composed of a series of elastic jaws provided with a slide-ring and a handle, is not new. In my handkerchief-holder, instead of a wire ring-slide, I have one of trumpet-form, as represented, which, by being hollow or chambered, so closes over the handkerchief and the jaws when they are in connection, as to cause the handkerchief to surround and envelope the jaws in a manner to keep them from sight. Besides this, it aids to better advantage in keeping the handkerchief in connection with the jaws. Therefore,

I claim—

The handkerchief-holder composed of the stem B, provided at one end with the jaws C D D, and at the other with a loop, in combination with the trumpet-shaped slide A, all constructed and arranged substantially as shown and described.

HERBERT G. MACKINNEY.

Witnesses:
R. H. EDDY,
J. R. SNOW.